US006231929B1

(12) United States Patent
Milbourn

(10) Patent No.: US 6,231,929 B1
(45) Date of Patent: May 15, 2001

(54) SLIDE COATING APPARATUS HAVING A LOW SURFACE ENERGY REGION

(75) Inventor: Thomas M. Milbourn, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/442,166

(22) Filed: Nov. 16, 1999

Related U.S. Application Data

(63) Continuation of application No. 08/659,053, filed on May 31, 1996, now Pat. No. 5,998,549.

(51) Int. Cl.[7] .................................................... B05C 5/02
(52) U.S. Cl. ........................... 427/402; 118/409; 118/416
(58) Field of Search ..................................... 118/412, 409, 118/411, 416; 427/402; 239/104

(56) References Cited

U.S. PATENT DOCUMENTS

| | | |
|---|---|---|
| 2,681,294 | 6/1954 | Beguin . |
| 2,803,615 | 8/1957 | Ahlbrecht et al. . |
| 2,841,573 | 7/1958 | Ahlbrecht et al. . |
| 3,787,351 | 1/1974 | Olson . |
| 3,955,035 | 5/1976 | Ito et al. . |
| 4,049,861 | 9/1977 | Nozari . |
| 4,101,513 | 7/1978 | Fox et al. . |
| 4,156,046 | 5/1979 | Lien et al. . |
| 4,415,615 | 11/1983 | Esmay et al. . |
| 4,443,504 * | 4/1984 | Burket et al. ..................... 118/412 X |
| 4,445,548 | 5/1984 | O'Brien . |
| 4,560,599 | 12/1985 | Regen . |
| 4,853,737 | 8/1989 | Hartley et al. . |
| 5,066,712 | 11/1991 | Lewis . |
| 5,242,972 | 9/1993 | Negishi et al. . |
| 5,380,365 * | 1/1995 | Hirshburg ............................. 118/410 |
| 5,405,442 * | 4/1995 | Korokeyi .............................. 118/325 |
| 5,468,812 | 11/1995 | Muggli et al. . |
| 5,532,121 | 7/1996 | Yonkoski et al. . |
| 5,843,530 * | 12/1998 | Jerry et al. ........................... 427/402 |
| 5,998,549 * | 12/1999 | Milbourn et al. ................. 427/407.1 |
| 6,036,105 * | 3/2000 | Sanada et al. ....................... 239/104 |

FOREIGN PATENT DOCUMENTS

| | | |
|---|---|---|
| 4010881 | 10/1990 | (DE) . |
| 0 373 866 A3 | 6/1990 | (EP) . |
| 0 401 496 A2 | 12/1990 | (EP) . |
| 0 581 962 A1 | 2/1994 | (EP) . |
| 581962 * | 2/1994 | (EP) . |
| 97001028 | 1/1997 | (JP) . |

OTHER PUBLICATIONS

"The Surface–active Properties of Fluorine–containing Acrylate Esters," translated from *Zhurnal Fizicheskoi Khimii* (Russian Journal of Physical Chemistry, Bekhli et al., 56 (11), 1982, pp. 1786–1787.

* cited by examiner

*Primary Examiner*—Kevin Weldon

(57) ABSTRACT

A slide coating apparatus for coating liquid with a first slide member having a first slide surface onto which a first liquid may flow, and a second slide member having a second slide surface over which the first liquid may flow, the first slide member being positioned relative to the second slide member to form a first slot through which the first liquid may flow before flowing over the second slide surface, the first slide surface being positioned relative to the second slide surface such that at least a portion of the first liquid flowing from the first slot may flow onto the first slide surface rather than to flow directly from the first slot over the second slide surface, the first slide surface having a low surface energy region positioned such that it may come in contact with the first liquid.

22 Claims, 5 Drawing Sheets

SLIDE COATING APPARATUS HAVING A LOW SURFACE ENERGY REGION

This application is a continuation of application Ser. No. 08/659,053 filed May 31, 1996 now U.S. Pat. No. 5,998,549.

FIELD OF THE INVENTION

The present invention relates to novel polymeric compounds and their use as durable, low surface energy coatings for dies, edge guides, and other surfaces of coating apparatuses and other fluid-contacting components. More particularly, the present invention relates to novel polymeric compounds and their use with coating dies to minimize streaking and to minimize damage due to die-cleaning procedures.

BACKGROUND OF THE INVENTION

The process of applying or coating liquids onto substrates or webs is well known. However, the process can be complex depending on the liquid and the substrate used, on the performance objectives of the end product, and on the process itself. Many coating apparatus and coating process variations have been developed to address specific coating needs.

U.S. Pat. No. 2,681,294 discloses a vacuum method for stabilizing the coating bead for direct extrusion and slide types of metered coating systems. Such stabilization enhances the coating capability of these systems. However, these coating systems lack sufficient overall capability to provide the thin wet layers required for some coated products, even at very low liquid viscosities.

U.S. Pat. No. 4,445,458 discloses an extrusion type bead-coating die with a beveled draw-down surface to impose a boundary force on the downstream side of the coating bead and to reduce the amount of vacuum necessary to maintain the bead. Reduction of the vacuum is noted to minimize chatter, streaks, and other coating defects. Coating quality is noted to be further improved by optimizing the obtuse angle of the beveled surface with respect to the slot axis and the position along the slot axis of the bevel toward the moving web (overhang) and away from the moving web (underhand. The optimization results in the high quality desired for coating photosensitive emulsions. However, the thin-layer performance capability desired for some coated products is lacking.

A common problem encountered with extrusion die coaters and with slide coaters has been the occurrence of streaking of the liquid when applied to the substrate. One cause of streaking is dried liquid residue on the die lips near the coating bead. This cause and the resulting streaking problem are especially prevalent for low-viscosity liquids containing a highly-volatile solvent.

European Laid Open Patent Application EP 0 581 962 A1 describes one approach for reducing coating defects. A eutectoid dispersion of a fluorine-containing resin (such as Teflon™) and nickel is plated onto the die faces and lips of the coating apparatus. Upon curing, this surface is reported to provide the hardness and dimensional stability necessary for a coating die while also keeping the water-repelling property of a fluorinated surface. This treatment is noted to prevent wetting of the die surface by the coating liquid and reduces streaking, dripping, and edge waviness in the coating.

U.S. Pat. No. 5,380,365 describes covering or coating a surface of a slide coating die adjacent to and below the coating bead with a low energy material, such as a fluorinated polyethylene. The covering starts 0.05–5.00 mm below the coating lip tip and extends away from the coating bead. The low surface energy covering is separated from the coating lip tip by a bare metal strip. This locates the bead static contact line. The low energy covering is noted to eliminate coating streaks and to facilitate die cleanup.

A number of known compounds are described in such patents as U.S. Pat. No. 3,787,351 (Olson). This patent describes oligomers containing fluoroaliphatic groups and poly(oxyalkylene) solubilizing groups. These oligomers are said to be useful as wetting agents in order to improve the mechanical properties of shaped articles of filled resin composites, e.g., glass-reinforced polyester or epoxy resin composites. Further, U.S. Pat. No. 4,415,615 (Esmay et al.) discloses the use of some of the oligomers of U.S. Pat. No. 3,787,351 as surfactants in the preparation of cellular pressure-sensitive adhesives in order to produce a uniform cell structure.

Non-fluorinated polymerizable surfactants have been described, e.g., in U.S. Pat. No. 4,560,599 (Regen). That patent describes a method for direct stepwise coating of a solid substrate with a polyfunctional polymerizable surfactant. Among the polymerizable surfactants used are methacrylate-functional phosphatidyl cholines and phosphate esters.

Zh. Fiz. Khim., 1982, 56, 2898 (Abstract) describes fluorine-containing acrylates of the formula $CH_2=CHCO_2CH_2(CF_2CF_2)_n$ wherein R is H or F, and n is 1 to 4, as being useful for imparting hydrophobicity and chemical resistance to the surface of polymers by copolymerization.

U.S. Pat. No. 5,468,812 (Muggli et al.) describes polymeric, oligomeric fluorochemical surfactant compositions having at least two pendent fluoroaliphatic groups, at least two organic-solubilizing groups, and a pendent polymerizable olefinic group (prepared from a bifunctional monomer). The compositions reduce the surface energy of acrylate-based pressure-sensitive adhesives. They can be used in preparing acrylate-based pressure-sensitive adhesives that coat well due to the presence of the surfactant and maintain adhesive performance upon aging.

However, a need remains for a streak-reducing material which withstands the abrasion and/or the impact which occur during normal working conditions. Abrasion resistance can be particularly important when the liquid being coated has an abrasive quality and when clean-up involves wiping surfaces with cloths, brushes, and the like. Impact resistance can be particularly important when the coating process can include instances when the web or substrate breaks and strikes the material.

The durable streak-reducing material should be easily, quickly, and cost-effectively applied. The application process should not require that the coating apparatus be taken off-line for a significant duration to apply the material. Preferably, the application process is relatively quick and can be accomplished at or near the coating site, rather than requiring the coating apparatus to be shipped to a facility which has highly specialized capabilities.

In addition, the process of applying the streak-reducing material should not involve a significant risk of detrimentally affecting the coating apparatus. For example, the process should not run the risk of dimensionally distorting the coating apparatus by requiring the coating apparatus to be raised to a temperature above a critical level.

The process of applying the streaking-reducing material also should involve no more than a moderate capital investment, and the process and the material itself should provide for only a moderate cost to actually apply the material to the coating apparatus.

SUMMARY OF THE INVENTION

The present invention addresses shortcomings of known slide coating apparatuses. One embodiment of the present invention involves a slide coating apparatus for coating liquid with a first slide member having a first slide surface onto which a first liquid may flow. The apparatus also includes a second slide member having a second slide surface over which the first liquid may flow. The first slide member is positioned relative to the second slide member to form a first slot therebetween through which the first liquid may flow before flowing over the second slide surface. The first slide surface is positioned relative to the second slide surface such that at least a portion of the first liquid flowing from the first slot may flow onto the first slide surface rather than to flow directly from the first slot over the second slide surface. The first slide surface has a low surface energy region positioned such that the low surface energy region may come in contact with the first liquid flowing from the first slot.

In preferred embodiment, the first slide member is a first slide block and the second slide member is a second slide block. The first and second slide blocks may be made of stainless steel. The second slide surface may have a greater surface energy than the low surface energy region. The first slide surface may have a second region apart from the low surface energy region. The second region may have a greater surface energy than the low surface energy region. The second slide surface may be angled downwardly away from the first slot. The first slide surface may be angled downwardly toward the first slot. The first slide member may have a first front surface that partially forms the first slot and forms a first front edge with the first slide surface. The low surface energy region may be positioned adjacent the first front edge. The low surface energy region may be positioned substantially parallel to the first front edge.

The first slide surface may have a center region, a right side region, and a left side region, and the low surface energy region may be positioned on at least one of the right and left side regions. The first slide member may have a right side edge guide and a left side edge guide. The right side edge guide may provide the right slide region and the left side edge guide may provide the left side region.

The first slide surface may be planar to the second slide surface.

The slide coating apparatus may further include a back-up roll positioned such that the second slide member is between the back-up roll and the first slide member. The back-up roll provides support for a substrate onto which the first liquid may flow.

The slide coating apparatus may further include a third slide member positioned such that the second slide member is between the first slide member and the third slide member. The low surface energy region may include a fluorochemical compound.

In still another embodiment, the slide coating apparatus for coating liquid may include a first slide block having a first slide surface onto which a first liquid may flow, a second slide block having a second slide surface over which the first liquid may flow, and a back-up roll positioned such that the second slide block is between the back-up roll and the first slide block. The back-up roll provides support for a coating substrate onto which the first liquid may flow. The first slide block may be positioned relative to the second slide block to form a first slot therebetween through which the first liquid may flow before flowing over the second slide surface. The first slide surface may be angled downwardly toward the first slot and the second slide surface may be angled downwardly away from the first slot. The first slide surface may be positioned relative to the second slide surface such that at least a portion of the first liquid may flow onto the first slide surface rather than to flow directly from the first slot and down the second slide surface. The first slide surface may have a low surface energy region positioned such that the low surface energy region may come in contact with the first liquid flowing from the first slot. The second slide surface has a greater surface energy than the low surface energy region. This embodiment may further include at least one additional slide block positioned relative to the first and second slide blocks to form at least a second slot through which a second liquid may flow and over which the first liquid may flow.

Other aspects, advantages, and benefits of the present invention are apparent from the detailed description, examples, and claims.

BRIEF DESCRIPTION OF THE DRAWINGS

The foregoing advantages, construction, and operation of the present invention will become more readily apparent from the following description and accompanying drawings.

DETAILED DESCRIPTION OF PREFERRED EMBODIMENTS

Figure 1:
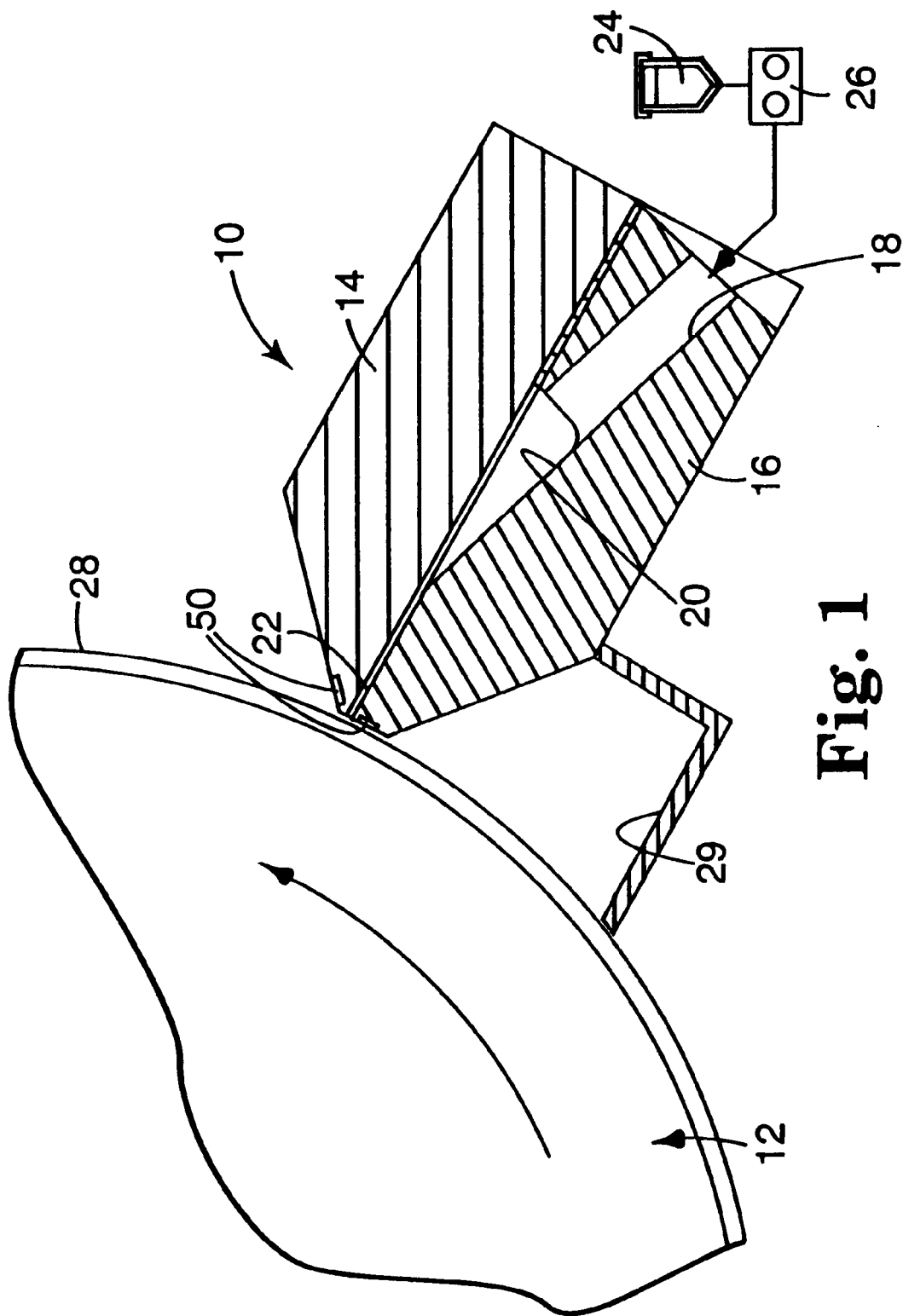
FIG. 1 is a schematic, cross-sectional side view of an extrusion die in accordance with the present invention.

The novel polymeric compounds of the present invention are particularly useful as durable, low surface energy (DLSE) coatings for dies, edge guides, and other surfaces of coating apparatuses. The following discloses preferred compositions and articles, apparatuses, and methods for using the compositions. The fluorinated monomer, bifunctional monomer, and organic-solubilizing monomer of the fluoroaliphatic oligomer portion of the invention will be further illustrated with reference to the preferred embodiment shown in Formula I.

The Fluoroaliphatic Monomer

The fluorinated monomer contains a fluoroaliphatic group (i.e., a fluorinated aliphatic group), designated herein as $R_f$. $R_f$ is a stable, inert, nonpolar, preferably saturated monovalent group which is both oleophobic and hydrophobic. A fluorinated oligomer preferably comprises from about 2 to about 25 $R_f$ groups and preferably comprises about 5 percent to about 30 percent, and more preferably about 8 percent to about 20 percent fluorine by weight-based on the total weight of the oligomer, the loci of the fluorine being essentially in the $R_f$ groups. $R_f$ preferably contains at least 3 carbon atoms, more preferably 3 to 20 carbon atoms, and most preferably 6 to 12 carbon atoms. $R_f$ can contain straight chain, branched chain, or cyclic fluorinated alkyl groups or combinations thereof, or combinations thereof with straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, and more preferably about 50% to about 78% fluorine by weight. The terminal portion of the $R_f$ group contains a perfluorinated terminal group. This terminal group preferably contains at least 7 fluorine atoms, e.g., $CF_3CF_2CF_2$—, $(CF_3)_2CF$—, or the like. Perfluoroaliphatic groups, i.e., those of the formula $C_yF_{(2y-1)}$, are the most preferred embodiments of $R_f$.

The fluoroaliphatic monomer is a fluorinated ethylenically unsaturated monomer. Fluorinated ethylenically unsaturated monomers and methods for the preparation thereof are known and disclosed, e.g., in U.S. Pat. No. 2,803,615 (Ahlbrecht et al.) and U.S. Pat. No. 2,841,573 (Ahlbrecht et al.), which disclosures are incorporated herein by reference. Examples of such compounds include general classes of fluorochemical olefins such as acrylates, methacrylates, vinyl ethers, and allyl compounds containing fluorinated sulfonamido groups, acrylates or methacrylates derived from fluorochemical telomer alcohols, fluorochemical thiols, and the like.

In its simplest form, the fluorinated, ethylenically unsaturated monomer contains a fluorocarbon group bonded to an ethylenically unsaturated group. Alternatively, and preferably, the fluorocarbon group is bonded to a hydrocarbon portion which in turn is bonded to an ethylenically unsaturated group. The fluorochemical group may be directly bonded to the hydrocarbon group or it may be bonded through a bridging group such as a sulfonamido group. The preferred ethylenically unsaturated portion of the monomer is an acrylate group or a methacrylate group. The preferred bridging group is a sulfonamido group.

Representative fluorinated, ethylenically unsaturated monomers are as follows:

$C_8F_{17}CH_2CH_2N(CH_3)C(O)CH=CH_2$,
$C_8F_{17}CH_2CH_2OC(O)CH=CH_2$,
$C_6F_{13}C_2H_4SC(O)CH=CH_2$,
$C_7F_{15}CH_2OC(O)C(CH_3)=CH_2$,
$C_8F_{17}SO_2N(C_2H_5)C_2H_4NHC(O)CH=CH_2$,
$(CF_3)_2CF(CF_2)_8C_2H_2SC(O)C(CH_3)=CH_2$,
$C_8F_{17}SO_2N(CH_3)C_2H_4OC(O)CH=CH_2$,
$C_8F_{17}SO_2N(CH_3)CH_2C_6H_4CH=CH_2$,
$C_6F_{13}CH_2CH_2O(O)CC(=CH_2)COOCH_2CH_2C_6F_{13}$,
$C_7F_{15}CH_2OOCCH=CHCOOCH_2C_7F_{15}$,
$C_6F_{13}C_2H_4N(CH_2CH_2OH)C(O)CH=CH_2$,
$C_7F_{15}CON(C_2H_5)C_3H_6SC(O)C(CH_3)=CH_2$,
$C_6F_{13}CH_2NHC(O)CH=CH_2$,
$C_6F_{17}CH_2CH_2OCH=CH_2$,
$(CF_3)_2CF(CF_2)_6CH_2CH(OH)CH_2OC(O)CH=CH_2$,
$(CH_3)_2CFOC_2F_4OC(O)CH=CH_2$,
$C_8F_{17}C_2H_4SO_2N(C_3H_7)C_2H_4OC(O)CH=CH_2$,
$C_7F_{15}C_2H_4CONHC_4HOC(O)CH=CH_2$,
$C_7F_{15}COOCH_2C(CH_3)_2CH_2OC(O)C(CH_3)=CH_2$,
$C_8F_{17}SO_2N(C_2H_5)C_4H_8OC(O)CH=CH_2$,
$(C_3F_7)_2C_6H_3SO_2N(CH_3)C_2H_4OC(O)CH=CH_2$,
$C_8F_{17}CF=CHCH_2N(CH_3)C_2H_4OC(O)CH=CH_2$,
$C_8F_{17}SO_2N(CH_3)CH_2CH_2OC(O)C(CH_3)=CH_2$,
$C_6F_{13}SO_2N(CH_3)CH_2CH_2OC(O)CH=CH_2$,
$C_8F_{17}SO_2N(CH_3)CH_2CH_2OCH_2=CH_2$,
$C_8F_{17}SO_2NHCH_2CH=CH_2$

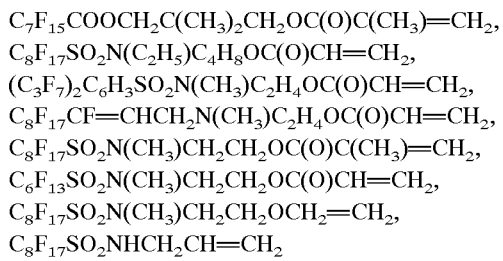

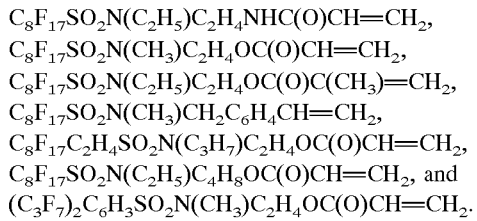

and combinations thereof. Preferred fluorinated, ethylenically unsaturated monomers are perfluoroaliphaticsulfonylamido acrylates and combinations thereof. Representative preferred perfluoroaliphaticsulfonylamido acrylates include:

$C_8F_{17}SO_2N(C_2H_5)C_2H_4NHC(O)CH=CH_2$,
$C_8F_{17}SO_2N(CH_3)C_2H_4OC(O)CH=CH_2$,
$C_8F_{17}SO_2N(C_2H_5)C_2H_4OC(O)C(CH_3)=CH_2$,
$C_8F_{17}SO_2N(CH_3)CH_2C_6H_4CH=CH_2$,
$C_8F_{17}C_2H_4SO_2N(C_3H_7)C_2H_4OC(O)CH=CH_2$,
$C_8F_{17}SO_2N(C_2H_5)C_4H_8OC(O)CH=CH_2$, and
$(C_3F_7)_2C_6H_3SO_2N(CH_3)C_2H_4OC(O)CH=CH_2$.

The Organic-Solubilizing Monomer

The organic-solubilizing monomer contains an organic-solubilizing group, designated herein as $R_s$. $R_s$ groups render the fluorinated oligomer prepared in step (i) soluble in organic media such as conventional solvents, e.g., ketones, esters, ethers, and hydrocarbons, polymerizable mixtures of acrylic acids, methacrylic acids, acrylates and methacrylates, and the like. The particular preferred number of $R_s$ groups will depend on the nature of the particular $R_s$ groups and the particular medium in which the compound is intended to be solubilized. Generally, however, a plurality of $R_s$ groups is preferred, e.g., about 2 to about 60, more preferably about 4 to about 30. Each $R_s$ group contains at least 4 carbon atoms and optionally contains at least one catenary oxygen atom. $R_s$ groups preferably contain from about 8 to about 50 carbon atoms and can be straight chain, branched chain, cyclic, or any combination thereof. The organic-solubilizing group $R_s$ is preferably pendent to the fluorinated oligomer. Preferred $R_s$ groups include polyoxyalkylene or polyoxyalkylenyl groups, e.g., polyoxyethylene or polyoxyethylenyl, and straight chain, branched chain, cyclic alkyl or alkylene groups, e.g., butyl, butylene, octyl, octylene, isooctyl, isooctylene, octadecyl, or octadecylene, and combinations thereof.

Solubilizing monomers are well known and generally commercially available or easily prepared by those skilled in the art. Exemplary solubilizing monomers include $C_2$ and longer, and preferably $C_4$ and longer alkyl acrylate and methacrylates such as iso-butyl methacrylate, iso-octyl acrylate, octadecyl methacrylate and the like; acrylates and methacrylates of polyalkylene glycols, such as triethyleneglycol acrylate; acrylates and methacrylates of methoxypolyethylene glycols and polyethylene glycols (available as Carbowax™), acrylates and methacrylates of block copolymers of ethylene oxide and propylene oxide endcapped by hydroxy groups (available as Pluronic™), acrylates and methacrylates of tetramethyleneoxide glycols (available as Terathane™); and acrylamides and methacrylamides of amino-terminated polyethers (available as Jeffamine™m).

The Bifunctional Monomer

The bifunctional monomer contains an organic functional group, designated herein as $R_b$, capable of reacting with an epoxy-silane. $R_b$ can be any group that is capable of reacting with an epoxy-silane. Examples of such groups include hydroxy, amino, carboxcylic acids, and sulfonic acids. $R_b$ is preferably a hydroxy group. Bifunctional monomers containing such groups are well known and generally commercially available or easily prepared by those skilled in the art.

Exemplary bifunctional monomers include: acrylamide, methacrylamide, maleamide, maleimide, N-isopropyl acrylamide, glyoxal bisacrylamide, N-methylol acrylamide, N-methylol methacrylamide, diacetone acrylamide, diacetone methacrylamide, methylolated diacetone acrylamide, methylolated diacetone methacrylamide, 2-hydroxy-3-chloropropyl acrylate 2-hydroxy-3-chloropropyl acrylate methacrylate, hydroxy $C_2$ to $C_4$ alkyl acrylates and methacrylates, isobutenediol, allyloxyethanol, o-allyl phenol, divinyl carbinol, glycerol α-allylether, acrylic acid, methacrylic acid, and metal salts thereof, vinylsulfonic and styrene p-sulfonic acids and their metal salts, 3-aminocrotonitrile, monoallylamine, 2-acrylamido-2-methylpropanesulfonic acid (AMPS) and its salts, glycidylacrylate and methacrylate, allyl glycidyl ether and acrolein.

Preferred bifunctional monomers are hydroxy-containing acrylate monomers such as:

hydroxyethylmethacrylate (HEMA),
hydroxyethylacrylate (HEA),
hydroxypropylmethacrylate, and
hydroxypropylacrylate.

The Fluorinated Oligomer

As noted above, the fluorinated oligomer is a polymer of a fluorinated, ethylenically unsaturated monomer; a polyoxyethylene ethylenically unsaturated monomer, and a bifunctional, ethylenically unsaturated monomer. Examples of ethylenic unsaturation include general classes of olefins such as acrylates, methacrylates, vinyl ethers, and allyl compounds. Fluorinated oligomers useful in this invention can be prepared as described in U.S. Pat. No. 5,468,812 incorporated herein by reference.

The fluorinated oligomer can be conveniently prepared, thereby generating a polymeric backbone with the required pendent functionalities thereon. This can be done conveniently by selecting appropriate ethylenically unsaturated monomers with the desired pendent functionalities already present on the monomers so that they are also deposited on the polymer backbone. This is preferably done by forming an acrylate backbone by polymerization of at least three materials. Although acrylates are not the only materials that will work, they are preferred for the backbone.

The fluorinated oligomers are prepared by free-radical polymerization of the three monomers in the proportions desired for the final product. It is preferred that the monomers be present in the polymer as follows: about 30 to 50 wt % fluorinated, ethylenically unsaturated monomer; about 44 to 64 wt % polyoxyethylene unsaturated monomer; and about 6 to 16 wt % hydroxyl-containing ethylenically unsaturated monomer; and more preferably, 34.5, 54, 11.5 wt % of the three monomers, respectively. The polymerization is carried out in solvents such as ethyl acetate, 2-butanone, ethanol, 2-propanol, acetone, etc.

In the preferred embodiment illustrated in Formula I, the aliphatic backbone comprises a sufficient number of polymerized units to render the compound oligomeric. It is preferred that the backbone comprise about 5 to about 100 polymerized units, more preferably about 10 to about 50, and most preferably about 20 to about 40. A single polymerized unit can contain more than one type of pendent group. However, the polymerized units are preferably derived from fluorinated monomers, i.e., those containing a fluoroaliphatic group; solubilizing monomers, i.e., those containing solubilizing groups; and bifunctional monomers, i.e., those containing a functional group that can be further reacted with an epoxy-silane. The relative and absolute numbers of the several types of polymerized units in a compound are preferably such that the preferred number of the several types of corresponding pendent groups are present in the oligomer. Accordingly, with reference to Formula I, it is preferred that a is about 2 to about 80, more preferably about 5 to about 45; b is about 1 to about 60, more preferably about 2 to about 30; and c is about 2 to about 70, more preferably about 4 to about 55.

The ratio of moles of the several types of polymerized, units, and therefore the number of fluorinated, solubilizing, and polymerizable olefinic groups in the aliphatic backbone will not be the same in each oligomer present in a composition of the invention. Therefore, compositions and oligomers of the invention are generally characterized herein with respect to the overall ratio of polymerized units derived from each of the several types of monomers which is determined primarily by the relative amounts thereof used in the preparation of the composition.

The Linking Group Q

In the fluorinated oligomer, the fluorinated, solubilizing, and group capable of reacting with an epoxy-silane are linked to the aliphatic backbone by a linking group designated Q in Formula I. Linking group Q can be a covalent bond, a heteroatom, e.g., O or S, or an organic group. The linking group Q is preferably an organic group containing about 1 to about 20 carbon atoms, and optionally containing oxygen-, nitrogen-, or sulfur-containing groups or a combination thereof, and preferably free of functional groups, e.g., polymerizable olefinic double bonds, thiols, easily abstracted hydrogen atoms such as cumyl hydrogens, and other such functionalies known to those skilled in the art that substantially interfere with free-radical oligomerization. Examples of structures suitable for linking group Q include straight chain, branched chain, or cyclic alkylene, arylene, aralkylene, oxy, oxo, thio, sulfonyl, sulfinyl, imino, sulfonamide, carboxamido, oxycarbonyl, urethanylene, ureylene, and combinations thereof such as sulfonamidoalkylene. Preferred linking groups Q can be selected according to ease of preparation and commercial availability and will differ depending on whether it links $R_f$, $R_s$, or $R_b$ to the aliphatic backbone.

Below is a partial representative list of suitable organic Q groups. For the purposes of this list, each k is independently an integer from about 1 to about 20, g is an integer from 0 to about 10, h is an integer from about 1 to about 20, R' is hydrogen, phenyl, or alkyl of 1 to 4 carbon atoms, and R" is alkyl of about 1 to 20 carbon atoms.

—SO$_2$NR'(CH$_2$)$_k$O(O)C—
—CONR'(CH$_2$)$_k$O(O)C—
—(CH$_2$)$_k$O(O)C—CH$_2$CH(OH)CH$_2$O(O)C—CH$_2$CH(OR")CH$_2$O(O)C—(CH$_2$)$_k$C(O)O—(CH$_2$)$_k$SC(O)—
—(CH$_2$)$_k$O(CH$_2$)$_k$O(O)C—
—(CH$^2$)$_k$S(CH$_2$)$_k$O(O)C—
—(CH$_2$)$_k$(OCH$_2$CH$_2$)$_k$O(O)C—
—(CH$_2$)$_k$SO$_2$(CH$_2$)$_k$O(O)C—
SO$_2$NR$^1$(CH$_2$)$_k$O(CH$_2$CH$_2$)$_k$O(O)C—

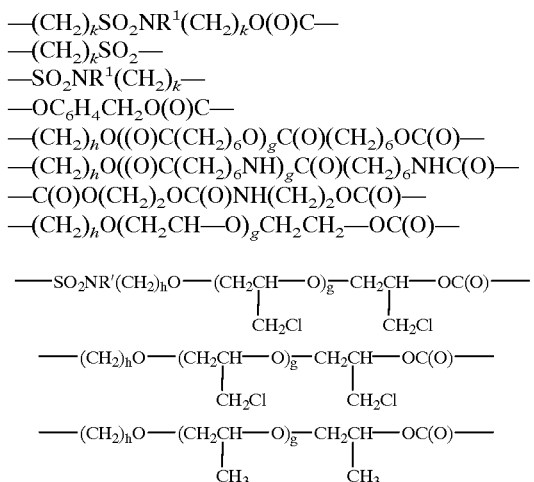

—$(CH_2)_kSO_2NR^1(CH_2)_kO(O)C$—
—$(CH_2)_kSO_2$—
—$SO_2NR^1(CH_2)_k$—
—$OC_6H_4CH_2O(O)C$—
—$(CH_2)_hO((O)C(CH_2)_6O)_gC(O)(CH_2)_6OC(O)$—
—$(CH_2)_hO((O)C(CH_2)_6NH)_gC(O)(CH_2)_6NHC(O)$—
—$C(O)O(CH_2)_2OC(O)NH(CH_2)_2OC(O)$—
—$(CH_2)_hO(CH_2CH—O)_gCH_2CH_2—OC(O)$—

—$CH_2CH_2OC(O)$—
$CH_2CH_2CH_2OC(O)$—

For linking $R_f$, Q is preferably alkylene or sulfonamido, or sulfonamidoalkylene. For linking $R_s$, Q is preferably oxycarbonyl. For linking $R_b$, Q is preferably alkyleneoxycarbonyl.

The aliphatic backbone of the fluoroaliphatic oligomer, of course, does not exist in the form shown in Formula I. Rather it is terminated on each end by hydrogen or by some organic group (not shown in Formula I). The terminal groups are present by virtue of the method used to prepare the compositions. The particular terminal groups present in a particular fluorinated compound are not unduly critical to the function of the compositions of the invention. Typical terminal groups include hydrogen or an alkylthio group which would be derived from an alkylthiol chain transfer agent.

The most preferred fluorinated oligomers can be prepared as shown below in the following reaction scheme:

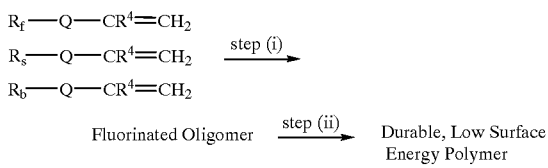

In step (i) of the reaction scheme, fluorinated, bifunctional, and solubilizing monomers are oligomerized to form an intermediate fluorinated oligomer of Formula II.

Formula II

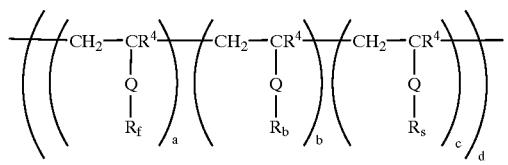

In the fluorinated oligomer of Formula II $R^4$, Q, $R_f$, $R_s$, $R_b$, a, b, c, and d are as defined above. The groups that terminate the oligomeric chains are not shown in the formula or the reaction scheme.

In step (i) of the reaction scheme the several types of monomers are present in the amounts necessary to afford a product containing the desired relative numbers of each type of monomer. Also present in step (i) is a chain-transfer agent that can serve to terminate the oligomeric chain at the proper length, thus controlling the absolute numbers of each type of monomer in the compound. Suitable chain-transfer agents contain a group capable of propagating and terminating a free-radical reaction and are well known to those skilled in the art. Representative chain transfer agents include thiols such as ethanethiol, propanethiol, butanethiol, n-octylthiol, t-dodecylthiol, 2-mercaptoethyl ether, 2-mercaptoimidazole, and the like. The chain-transfer agent is present in step (i) in an amount sufficient to control the number of polymerized units in the aliphatic backbone. The chain-transfer agent is generally used in an amount of about 1 to about 20 mole percent, preferably about 3 to about 10 mole percent, based on the number of moles of monomers in the reaction.

Also present in step (i) is a free-radical initiator. Such compounds are known to those skilled in the art and include persulfates, azo compounds such as azo-bis-isobutyronitrile and azo-2-cyanovaleric acid and the like, hydroperoxides such as cumene, t-butyl, and t-amyl hydroperoxide, dialkyl peroxides such as di-t-butyl and peroxide, peroxyesters such as t-butyl perbenzoate and di-t-butylperoxy phthalate, diacylperoxides such as benzoyl peroxide and lauroyl peroxide.

A suitable amount of initiator depends on the particular initiator and other reactants being used. About 0.1 percent to about 5 percent, preferably about 0.1 percent to about 1 percent, by weight of an initiator can be used, based on the total weight of all other reactants in the reaction.

Step (i) is preferably carried out in an inert atmosphere such as, for example, in an atmosphere of dry nitrogen. Step (i) can be carried out in any solvent suitable for organic free-radical reactions. The reactants can be present in the solvent and can be any suitable concentration, e.g., from about 5 percent to about 90 percent by weight based on the total weight of the reaction mixture. Examples of suitable solvents include: aliphatic and alicyclic hydrocarbons, e.g., hexane, heptane, and cyclohexane; aromatic solvents, e.g., benzene, toluene, and xylene; ethers, e.g., diethylether, glyme, diglyme, and diisopropyl ether; esters, e.g., ethyl acetate and butyl acetate; ketones, e.g., acetone, methyl ethyl ketone (MEK, 2-butanone), and methyl isobutyl ketone; sulfoxides, e.g., dimethyl sulfoxide; amides, e.g., N,N-dimethylformamide and N,N-dimethylacetamide; halogenated solvents such as methylchloroform, Freon™ 113, trichloroethylene and α,α,α-trifluorotoluene, and the like, and mixtures thereof.

Likewise, step (i) can be carried out at any temperature suitable for conducting an organic free-radical reaction. Particular temperatures and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

It should be realized that a further method of preparing the fluorinated oligomer composition of the invention having catenary solubilizing groups, e.g., crosslinked compositions, involves using in step (i) a bifunctional solubilizing monomer, i.e., one that contains a solubilizing group that connects two polymerizable olefinic moieties, instead of the illustrated monofunctional solubilizing monomer. Examples of suitable bifunctional solubilizing monomers include diacrylates and dimethacrylates of such polyoxyalkylene diols as Carbowax™ 1000, 1450, and 3350. When such a bifunctional solubilizing monomer is used, step (i) produces a lightly crosslinked fluorinated oligomer comprising catenary solubilizing groups. Depending on the nature of the $R_s$ group, the product of this alternate step (i) can be converted or further elaborated as described above in connection with step (ii) to afford a composition of the invention.

The Epoxy-Silane

As noted above, in step (ii) the fluorochemical oligimer of Formula II is further polymerized with an epoxy-silane to form the durable, low surface energy (DLSE) coatings of this invention.

Epoxy-silanes are compounds or materials having polymerizable (preferably terminal) epoxy groups and terminal, polymerizable silane groups, the linking of these groups being through a non-hydrolyzable aliphatic, aromatic, or aliphatic and aromatic divalent linking group which may have N and/or O atoms in the linking chain. The O atoms, for example, would be in the chain only as ether linkages.

The preferred epoxy-silanes which are useful in the radiation-curable compositions of this invention are compounds having terminal polymerizable epoxy (oxirane) groups and terminal silane groups, and can be represented by the formulae:

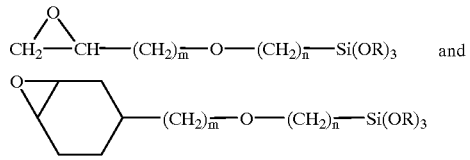

where m and n are integers from 1 to 4; and R is an aliphatic group of less than 10 carbon atoms such as methyl, ethyl, iso-propyl, butyl, vinyl, allyl; or any acyl group of less than 10 carbon atoms such as formyl, acetyl, or propionyl; or any group of the formula $(CH_2CH_2O)_jZ$ in which j is an integer of at least 1; and Z is any aliphatic group of less than 10 carbon atoms such as methyl, ethyl, iso-propyl, butyl, vinyl, and allyl. Preferably R is an alkyl group of 1 to 3 carbon atoms. Examples of representative preferred epoxy-silanes include:

γ-glycidoxypropyl trimethoxysilane,
γ-glycidoxypropyl triethoxysilane,
β-glycidoxyethyl trimethoxysilane,
γ-(3,4-epoxycyclohexyl)propyl trimethoxysilane,
β-(3,4-epoxycyclohexyl)ethyl trimethoxysilane, and the like. The most preferred epoxy-silane compound is γ-glycidoxypropyl trimethoxysilane.

In addition to any of the above epoxy-silanes the compositions of this invention can be any hydrozylates, prepolymer, or precondensate of the said silanes. The hydrozylates can be formed by the partial or complete hydrolysis of the OR groups of the silane. Thus the term "precondensate" includes siloxanes in which some of the silicon atoms are bonded through oxygen atoms. Prepolymers are formed by prepolymerization of groups other than the silanes as described in U.S. Pat. No. 4,100,134.

The polymerizable epoxy-functional silane constitutes from 76 to 95 wt %, preferably 80 to 90 wt % of the total composition.

Formation of the Durable, Low Surface Energy Polymer

There are numerous catalyst systems which are useful in the preparation of the coatings of the present invention. In curing systems having both epoxy groups and terminal, polymerizable silane groups, the art recognizes the utility of a number of different classes of catalysts some of which cure both the epoxy groups and the silane groups. U.S. Pat. No. 4,049,861 teaches the use of highly fluorinated aliphatic sulfonyl and sulfonic catalysts for the cure of epoxy-silanes. U.S. Pat. No. 3,955,035 teaches Lewis and Bronsted acid catalysts for epoxy-silanes, and U.S. Pat. No. 4,101,513 teaches the use of "onium," radiation sensitive catalysts for epoxy-silanes. All three of the classes of catalysts cure both the epoxy and silane groups to varying degrees and are the preferred catalysts for the epoxy-silane compositions. Different catalysts, such as diazonium salts are useful, and additional catalysts for individual groups may be added to be used in combination with these catalysts.

Examples of representative useful "onium" catalysts useful in preparing the coatings of the present invention are disclosed in U.S. Pat. No. 4,156,046, incorporated herein by reference. Typically, these are "aryl-onium" catalysts.

Examples of these catalysts having a Periodic Table Group VII-A cation include:

diphenyliodonium iodide,
diphenyliodonium chloride,
diphenyliodonium sulfate,
diphenyliodonium trichloroacetate,
diphenylbromonium chloride,
(4-clorophenyl)phenyliodonium iodide,
di(4-methoxyphenyl)iodonium chloride,
(4-methylphenyl)phenyliodonium tetrafluoroborate,
(4-trifluoromethyl)phenylphenyliodonium tetrafluoroborate,
2,2-diphenyliodonium hexafluorophosphate, and
1-(2-carboethoxynaphthyl)phenyliodonium chloride.

Examples of these catalysts having a Periodic Table Group V-A cation include:

(4-acetophenyl)triphenylammonium chloride,
(4-bromophenyl)triphenylphosphonium hexafluorophosphate,
di-(1-naphthyl)dimethylammonium tetrafluoroborate,
diphenacyldimethylammonium hexafluorophosphate,
diphenylmethylammonium tetrafluoroborate,
tetra(4-chlorophenyl)phosphonium iodide,
tetraphenylbismonium chloride,
tetraphenylphosphonium iodide,
tetraphenylphosphonium hexafluorophosphate,
tetraphenylarsonium tetrafluoroborate, and
tri-(3-thienyl)methylammonium tetrafluoroborate.

A preferred class of "onium" catalysts are those having a Periodic Table Group VI-A cation. Examples of these catalysts include:

triphenylsulfonium acetate,
triphenylsulfonium hexafluoroantirnonate,
triphenylsulfonium iodide,
triphenylsulfonium sulfate,
triphenylsulfonium trichloroacetate,
(4-chlorophenyl)diphenylsulfonium tetrafluoroborate,
(4-cyanophenyl)diphenylsulfonium iodide,
(2-nitrophenyl)phenylmethylsulfonium sulfate,
triphenylselenonium hexafluoroantimonate, and
triphenylteluronium pentachlorobismutate.

Methods for Using Articles and Apparatuses Which Use the Compositions

Figure 2:
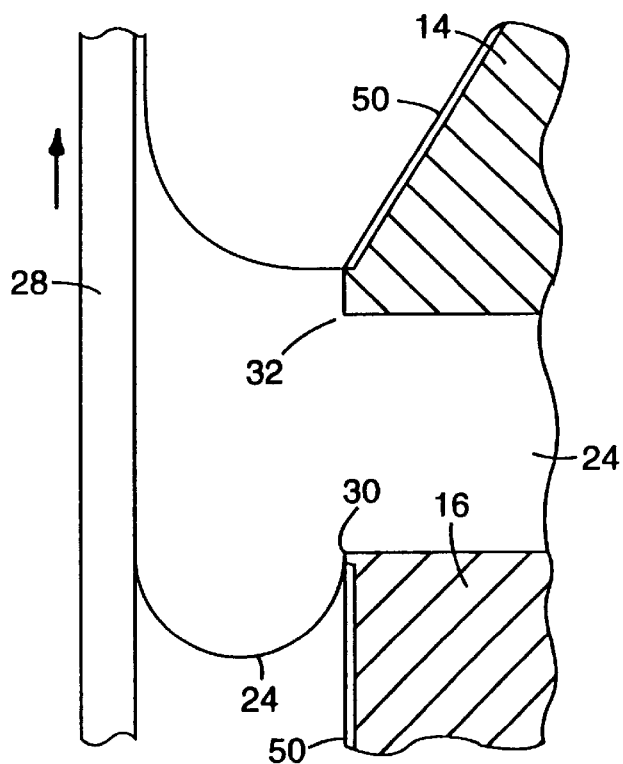
FIG. 2 is a cross-sectional partial side view of the extrusion die shown in FIG. 1.

FIGS. 1 and 2 show one embodiment of a coating apparatus, in this case an extrusion die 10, positioned relative to a back-up roll 12. As shown, the extrusion die 10 includes a die top 14, and a die body 16 which can be made of, for example, 15-5 stainless steel. A die inlet 18, a die manifold 20, and a die slot 22 are formed between the die top 14 and the die body 16.

A liquid 24, such as solution, mixture, dispersion, or emulsion, can be supplied by a pump 26 (or other means) to the die 10 for application to a substrate or web 28. The liquid 24 can flow through the die inlet 18 to the die manifold 20 for distribution through the die slot 22. By flowing through the die slot 22 as shown in FIG. 2, a bead of the liquid 24 can be applied to the web 28, for example, when the web is transported between the back-up roll 12 and the die 10. A vacuum chamber 29 can apply a vacuum to the liquid 24 upstream of the bead to stabilize the bead.

The liquid 24 can pass through the die slot 22 and form a continuous coating bead along the upstream die lip 30, the downstream die lip 32, and the web 28. The liquid 24 can be one of numerous liquids, including water-based liquids, organic solvent-based liquids and 100%-solids fluids. The upstream die lip 30 is part of the die body 16, and the downstream die lip 32 is part of die top 14.

The upstream and downstream die lips 30, 32 can be formed as sharp edges, or can be more rounded, for instance, as a result of polishing. The upstream and downstream lips 30, 32 should be clean and relatively free of nicks and burrs.

Key portions of the die 10 can be enhanced with a durable, low surface energy surface 50 (hereinafter, the DLSE surface 50). The significantly lower surface energy of the DLSE surface 50, as compared to the bare stainless steel portions of the die 10, minimizes wetting of the liquid 24 on the DLSE surface 50 which can reduce the formation of streaks during coating. And, the DLSE surface 50 can continue to provide this ability while withstanding the abrasion and the impacts which can occur in use. Moreover, the process of providing the die 10 with the DLSE surface 50 is relatively simple and cost-effective.

One embodiment of the DLSE surface 50 can include the previously described durable, low surface energy compositions and a primer compositions to increase the adhesion to the die 10. Specific embodiments of these compositions are described in the Examples Section within this disclosure. Primer compositions other than that described in the Examples Section can be used.

Variations of the durable, low surface energy composition other than those described in the Examples Section could also be used. For example, the fluorochemical described in the Examples could constitute between 1 to 30 percent of the durable, low surface energy composition, more preferably between 5 to 20 percent, and even more preferably between 7 to 13 percent (example 1: 10 percent).

FIG. 2 shows that the DLSE surface 50 can be inlayed on a portion of the die top 14 adjacent to the downstream die lip 32, and on a portion of the die body 16 adjacent to the upstream die lip 30. To allow for the inlayed DLSE surface 50, recesses can be cut in the die 10 which can be filled with the priming composition and the durable, low surface energy composition. The depth of the inlay can range, for example, from 0.01 to 0.2500 millimeter, although a shallower or deeper inlay is feasible. The width of inlay can range, for example, from 1 to 250 millimeter, although a narrower or wider inlay is feasible. The length of the inlay is preferably the same as the die width.

The die body 16 and/or the die top 14 can be cut such that the DLSE surface 50 is inlayed just slightly back from the die lip, as shown. This approach creates a small land at the die lip. Instead, the die body 16 and/or the die top 14 can be cut such that the DLSE surface 50 is applied right to the die lip. If this approach is used, it is preferred to polish the die lip with a mild abrasive to leave a smooth die lip surface. Another option involves having the DLSE surface 50 go beyond the die lip and into the die slot 22. Still another option simply involves applying the DLSE surface 50 onto the die body 16 and/or the die top 14 without cutting a depth to inlay the DLSE surface 50.

One embodiment of the method for applying the DLSE surface to the die 10 is described within the Examples Section of this disclosure. Generally, the method can include the steps: (a) preparing specific portions of the die 10 for the DLSE surface 50, (b) priming the prepared portions with a primer composition, (c) curing the primer composition, (d) roughening the set primer composition, (e) applying a durable, low surface energy composition to the primed portions, and (f) curing the durable, low surface energy component.

Figure 3:
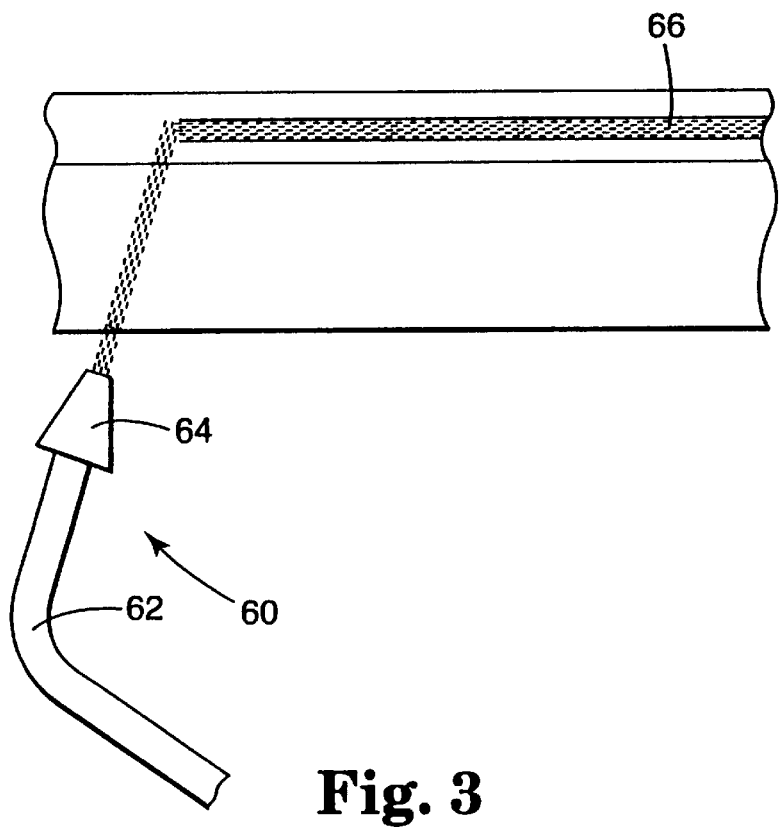
FIG. 3 is a schematic isometric view of an apparatus useful for grit-blasting a surface prior to applying a durable, low surface energy surface in accordance with the present invention.

The preparing step can accomplish one or two objectives: first, to provide better adhesion between the die 10 and the primer composition, and second, to provide a recess into which the primer and durable, low surface energy composition can be applied. To protect the DLSE surface 50, a recess or trough can be machined into the portion of the die where the DLSE surface 50 will be located. To provide better adhesion, the portion of the die where the DLSE surface 50 will be located can be roughened. Roughening can be accomplished in a number of ways, including grit blasting, hand sanding with fine abrasive paper, and chemical etching with strong acid. FIG. 3 illustrates a grit blasting apparatus 60 which is made up of commercially available components. The grit blasting apparatus 60 can direct an abrasive powder at the die 10 to roughen the surface of the desired portion of the die 10. The grit blasting apparatus 60 can include a blast enclosure (not shown), an air compressor or a compressed nitrogen source (not shown), air or nitrogen pressure controls (not shown), an abrasive particle hopper (not shown), conduit 62, nozzle 64, nozzle-pivoting apparatus (not shown), and a workpiece translating apparatus (not shown).

The enclosure and the hopper are available from Empire Abrasive Equipment Corp. (2101 West Cabot Blvd., Langhorne, Pa., 19407) and are referred to as PRO-FINISH Model PF-3696. The controls, conduit 62, nozzles 64, and the abrasive powder are available from COMCO Inc. (2151 North Lincoln Street, Burbank, Calif. 91504). A preferred nozzle arrangement includes two nozzles which are positioned side-by-side. A preferred nozzle is the COMCO Model MB 1500-23 nozzle (rectangular orifice, 3.8 millimeters by 0.02 millimeters). The nozzle-pivoting or -oscillating apparatus includes a Model S57-83-MO stepper motor and Model S6 drive which are available from Compumotor Division of Parker Hannifin Corp. (5500 Business Park Drive, Rohnert Park, Calif. 94928-7902.

A variety of MicroBlaster Precision abrasive powders are available from COMCO, such as Silicon Carbide powder and Aluminum Oxide powder. To abrade the die 10 which is made of 15-5 Stainless Steel, a Silicon Carbide powder having a 10- to 100-micron particle size is preferred, although other sizes and powders are acceptable.

Pressurized air or nitrogen forces abrasive particles through the conduit 62 and out the nozzles 64. The nozzles 64 can be pointed toward a workpiece, such as a die body 16 (or a die top 14), such that the abrasive particles strike a surface of the die body 16 leaving an abraded portion 66. The die body 16 can be masked with tape such that only the desired portion of the die body 16 is struck by the abrasive particles.

To provide the desired abraded portion 66, air pressure is preferably set at 100 pounds per square inch; the orifices of the nozzles 62 are preferably positioned 1.25 centimeters from the die body 16; and, the nozzles are translated across the die body 16 at a rate of 2.5 centimeters per minute and pivoted or reciprocated at a rate of 24 cycles per second. The nozzle is pivoted or oscillated across a 26 degree range (from −13 degrees from horizontal to +13 degrees from horizontal). The nozzle is translated across the die component at a rate of 2.5 cm/minute. Other rates, distances and ranges, however, have been shown to provide the abraded portion 66. (Other abrading techniques could be used including the use of sandpaper or other roughening materials.)

Figure 4:
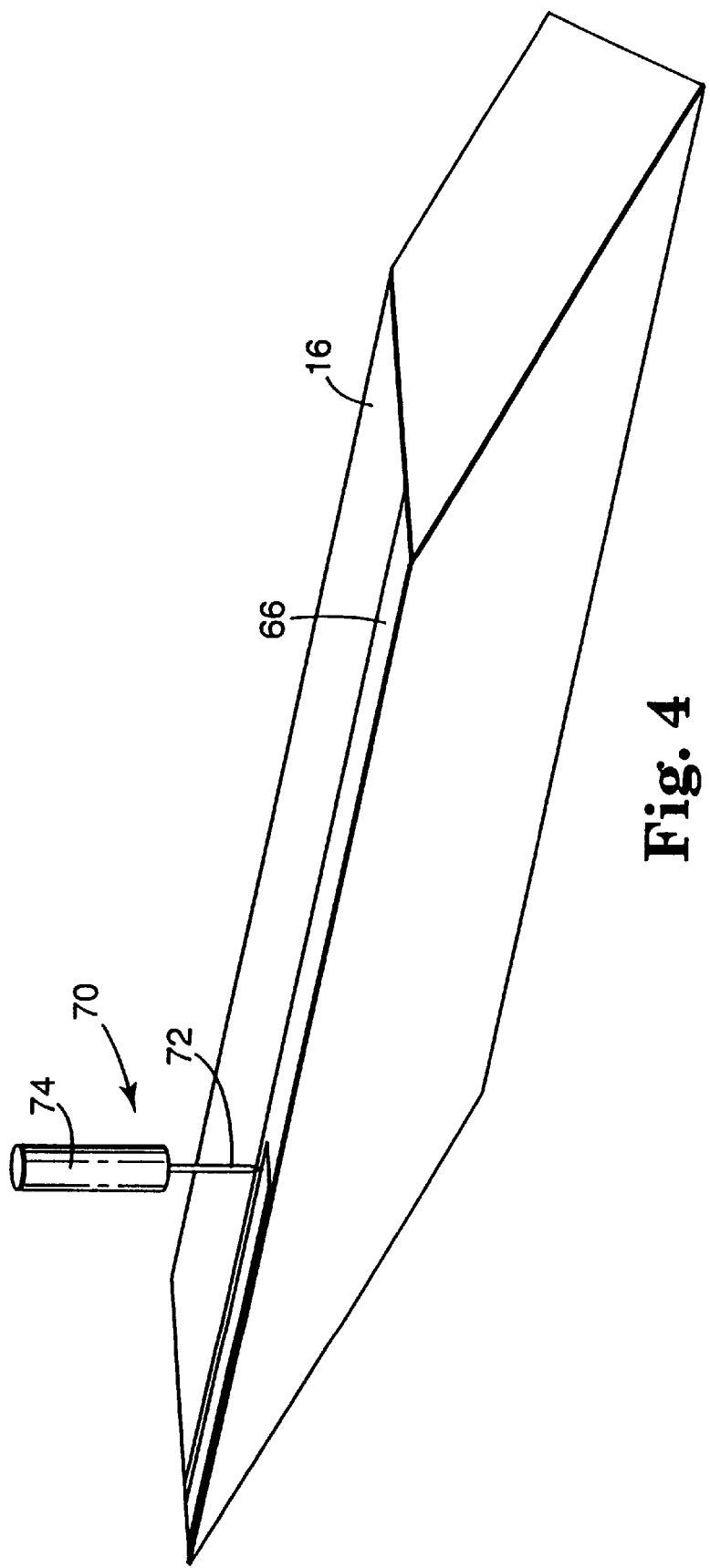
FIG. 4 is a schematic isometric view of an apparatus useful for applying a durable low surface energy surface coating in accordance with the present invention.

The priming step, which is particularly useful when applying the DLSE surface 50 to a stainless steel component, can involve leveling the die 10 and applying a primer composition to the abraded portion 66 of the die 10. A formulation of the primer composition is described in the Examples Section, although variations of that formulation and other formulations could be used. While the primer composition could be brushed or sprayed onto a portion or portions of the die 10, FIG. 4 schematically illustrates a preferred priming approach. This approach can involve the steps of: (a) positioning the abraded portion 66 of the die body 16 (or die top 14) relative to a composition applicator 70 and such that the abraded portion 66 is level, (b) translating the composition applicator 70 at a controlled velocity relative to the die body 16, (c) controlling the volumetric rate of primer composition from the composition applicator 70 to the die body 16, and (d) allowing the primer composition to spread over the abraded portion 66 of the die body 16.

The composition applicator 70 include a needle 72, syringe 74, and an actuating mechanism (not shown) for compressing the syringe at a controlled rate. An actuating mechanism is a 74900 Series syringe pump, which is commercially available from Cole-Parmer Instruments Company (7425 N. Oak Park Avenue, Niles, Ill. 60714). When applying the primer composition to the abraded portion 66 which is approximately 12.5-millimeter wide and 0.08 millimeter deep, the primer composition is preferably dispensed at a rate of 7.0 cubic centimeters per hour and the applicator 70 is preferably translated at a rate of 15.2 centimeters per minute. After dispensing the primer composition down the length of the abraded portion 66, the die body 16 remains stationary for the necessary time for the primer composition to flow outwardly and cover the abraded portion 66. A small paint brush, with all but a few brush fibers removed, can be used to spread the primer composition to any area uncovered by the primer composition.

Following the application of the primer composition to the abraded portion 66, the primer composition is subjected to ultraviolet radiation to cure the composition. An ultraviolet radiation source, available from XENON Corporation (20 Commerce Way, Woburn Mass. 01801), can pulse the ultraviolet radiation tube at a particular rate and for a particular duration. For the primer composition noted in the Examples Section applied to the 12.5 millimeter wide abraded portion 66, the ultraviolet radiation tube is preferably positioned 0.5 to 5 centimeters above the primer composition and preferably pulsed at a rate of 7 bursts per second and for a duration of 5 to 60 seconds. The preferred ultraviolet tube is Model 890-1741 which has an energy output of approximate 209 joules and which is available from XENON.

After the primer composition is cured on the die body 16, the primed surface is preferably grit blasted to allow for improved adhesion between the primed surface and the durable, low surface energy composition (hereinafter, DLSE composition). The same nozzles 64 as previously mentioned can be used, but with a Silicon Carbide powder (20 micron particle size available from COMCO). Preferably, the air pressure is 70 pounds per square inch; the distance from the orifice of the nozzles 64 to the workpiece is 25.4 millimeters; the nozzles 64 are pivoted at a rate of 24 cycles per second; and, the nozzle is translated through the die component at a rate of 15.2 centimeters per minute.

Next, the DLSE composition can be applied to the abraded, primed surface using the composition applicator 70 and following the same steps as those previously described for applying the primer composition. (The applications of the primer and the DLSE compositions could instead be done with an electrostatic sprayer, by simply using a dropper, by brushing, and even by dipping the component into the compositions.) Then, the durable low surface energy composition can be cured using the previously described curing equipment. The pulsed ultraviolet radiation is preferably applied for a duration of 18 seconds.

After curing the DLSE composition on the die top 14, a final step can involve polishing the DLSE surface 50 at the very tip of the downstream die lip 32 to remove or reduce the roughness at the tip which can be caused by the grit blasting step. But, this step is only advisable if the DLSE composition has been applied right up to the very tip of the die lip 32.

The previously described method for applying the DLSE surface 50 to a portion of a die body 16 and/or a die top 14 should be compared with the method for applying a fluorinated polyethylene coating (e.g., polytetrafluoroethylene-PTFE, Teflon™) to a die part. Within the Examples Section of this disclosure, a comparative example describes such a PTFE process. The PTFE coating and process is significantly different from the DLSE coating and process in several ways. First, while the PTFE coating can be abraded to some degree and still provide a low surface energy surface, the PTFE coating is relatively soft and can be rendered ineffective when a web tears in process and strikes the PTFE coating with sufficient force. The DLSE coating is significantly less susceptible to this sort of impact.

Second, the process of applying the PTFE is far more time-consuming than the DLSE process. This is significant because manufacturers strive to minimize production downtime, such as minimizing the time to have a die part coated or recoated. It is generally estimated that the time required to apply the PTFE composition is many times greater than the time required to apply the DLSE composition. This can have a very serious impact on production scheduling, production efficiencies, and capital investment.

In addition, the PTFE process involves subjecting the die part to a significantly higher temperature than the DLSE process. To bake the PTFE coating onto the die part, the die part is placed into an oven and heated to approximately 575 degrees Fahrenheit (302 degrees Celsius). The DLSE process can include heating the die part to between, for example, about 80 and about 140 degrees Fahrenheit (about 27 to 49 degrees Celsius), but more preferably to about 110 degrees Fahrenheit (43 degrees Celsius). When the steel used to make these die parts is heated to 575 degrees Fahrenheit and cooled back to room temperature, significant care must be taken to prevent dimensional changes and distortions within the die parts. This can be critical in that the surface of these die parts are commonly precision ground to allow for the precision coating when the die is in use, and dimensional changes can render a die part ineffective.

Furthermore, preparing a PTFE coating involves several more steps (e.g., multiple PTFE layers, final grinding of the PTFE coating) and can involve more handling of the die part being treated. More handling can increase the risk that a critical surface of a die part will inadvertently strike another object and be damaged by the impact. Damage to a critical surface of a die part can result in the need to regrind the surface or, worse yet, the need to replace the damaged die part all together. Both of these results can, of course, cause further production downtime and significant expense.

Figure 5:
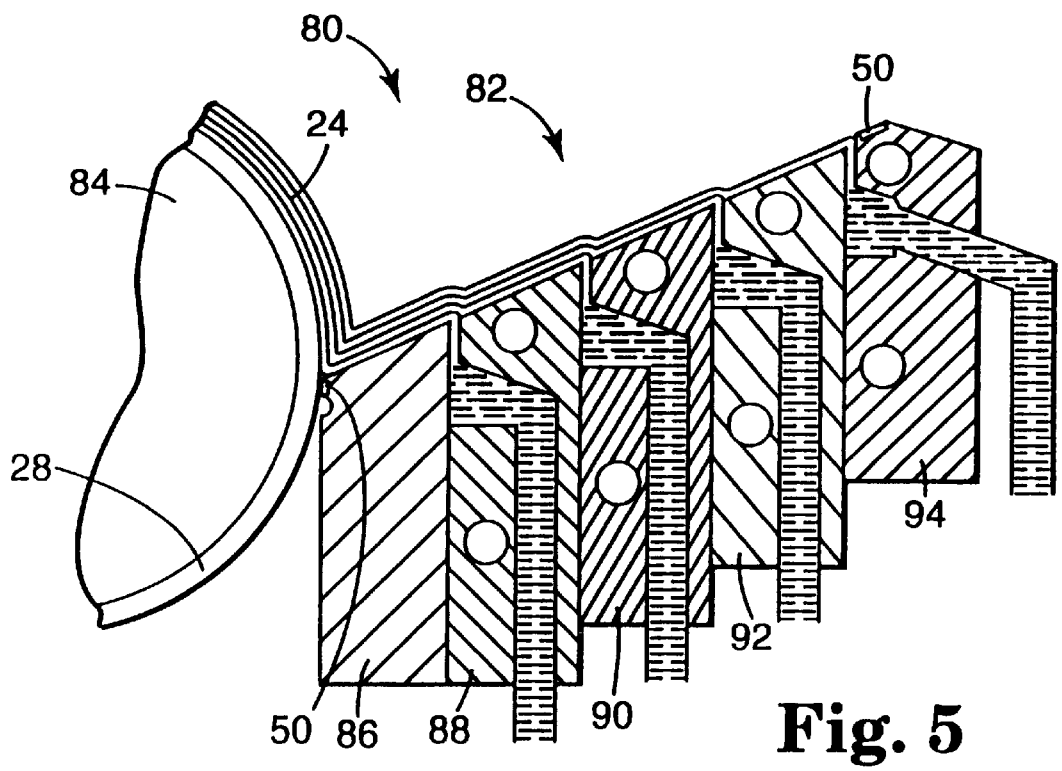
FIG. 5 is a schematic, cross-sectional side view of a slide coating apparatus in accordance with the present invention.

FIG. 5 illustrate an embodiment of a slide coating apparatus 80 which includes a DLSE surface 50 on two portions of the apparatus 80 which contacts the liquid 24. The slide coating apparatus 80 includes a slide assembly 82 and a slide back-up roll 84. The slide assembly 82 includes a number of slide blocks 86, 88, 90, 92, 94 which can simultaneously deliver multiple layers of liquid 24 to the web 28.

Figure 6:
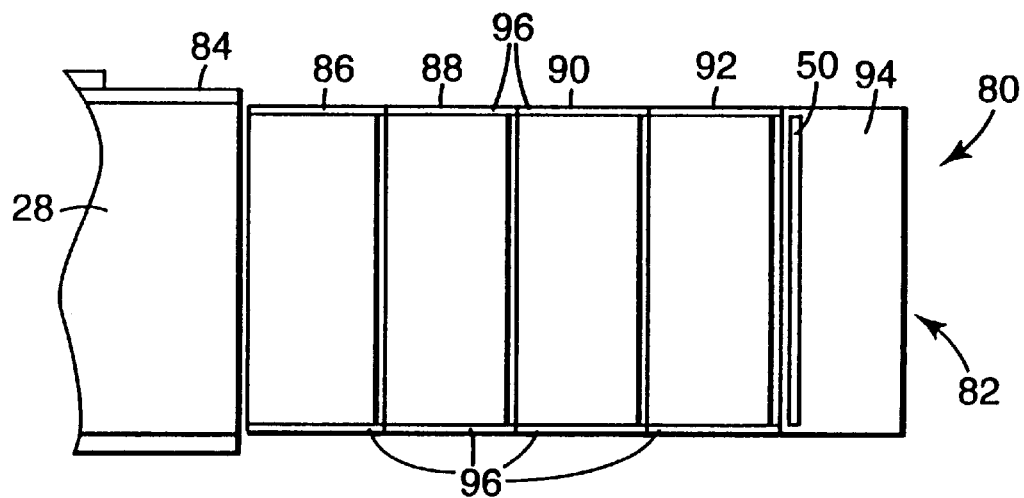
FIG. 6 is a cross-sectional partial side view of the slide coating apparatus shown in FIG. 5.
Figure 7:
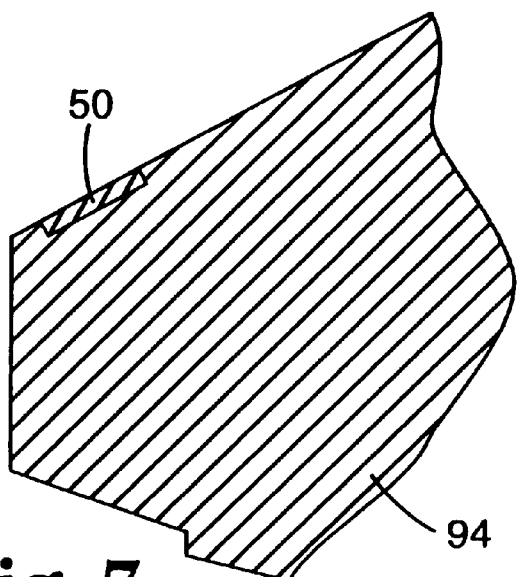
FIG. 7 is a cross-sectional partial side view of the slide coating apparatus shown in FIG. 6.
Figure 8:
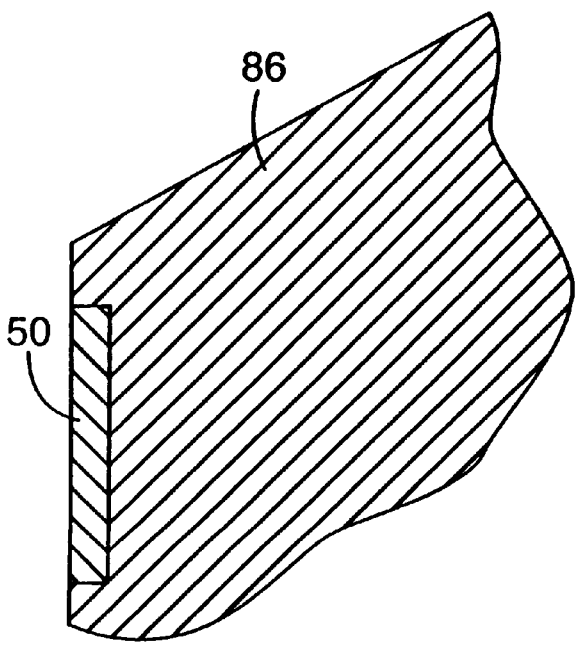
FIG. 8 is a partial top view of the slide coater shown in FIGS. 5–7.

FIGS. 6–8 more specifically show the locations of the DLSE surface 50 on the slide coating apparatus 80. In particular, FIGS. 6–7 illustrate that the DLSE surface 50 can be applied to the top surface of the last slide block 94 to minimize the wetting of the top surface by the liquid 24 flowing down the slide coating apparatus 80.

FIG. 6 shows edge guides 96 positioned to guide the liquid 24 toward the back-up roll 84 and the web 28. The DLSE surface 50 can be applied to the portions of the edge guides 96 which can minimize the wetting of the liquid 24 on the edge guides 96. If made of stainless steel, the edge guides 96 should be roughened and primed as previously discussed. But, if made of plastic (e.g., SL5170 epoxy from Ceiba-Geigy), the DLSE composition can be applied without the roughening and priming steps. The presence of the DLSE surface 50 on the portions of the edge guides which contact the coating fluid minimizes the wetting of the edge guides or a portion thereof. This can minimize the build-up/drying of coating solids on the edge guides which can adversely affect the quality of the coating.

FIG. 8 shows the surface of the first slide block 86 which is adjacent to the back-up roll 84. This surface can include a DLSE surface 50 to minimize the wetting of the liquid 24 down this surface of the first slot block 86. This, in turn, minimizes the build-up of coating solids and the related adverse consequences.

The DLSE surface 50 could be applied to portions of the extrusion die 10 and the slide assembly 82 other than those previously described, and to other coating apparatuses and fluid contacting surfaces. In addition, the DLSE surface 50 could provide a durable, low surface energy surface for apparatuses or components other than those involved in the process of applying liquids to substrates. Furthermore, variations of the DLSE surface 50, other than those already described, are contemplated by the Applicants and should be considered as part of the disclosed invention.

Objects and advantages of this invention will now be illustrated by the following examples, but the particular materials and amounts thereof recited in these examples, as well as other conditions and details, should not be construed to unduly limit this invention.

EXAMPLES

All materials used in the following examples are readily available from standard commercial sources, such as Aldrich Chemical Co. (Milwaukee, Wis.). All percentages are by weight unless otherwise indicated. The following additional terms and materials were used.

EtFOSEMA is N-ethyl-perfluoro(octane) sulfonamidoethyl methacrylate, and is available from 3M Company, St. Paul, Min.

γ-glycidoxypropyl trimethoxysilane is available under the name Z-6040 from Dow Chemical Company, Midland, Mich. It is also available under the name A-187 from OSi Specialties Inc, Danbury, Conn.

Triphenylsulfonium hexafluoroantimonate was obtained from 3M Company, St. Paul, Minn. It is also available from Union Carbide, Danbury, Conn.

Example 1

Preparation of Carbowax 750 Acrylate:

Carbowax 750 is a polyethylene glycol monomethyl ether available from Union Carbide, Danbury, CT. It is believed to have the approximate formula $CH_3O-(CH_2CH_2O)_{16}-OH$.

Carbowax 750 acrylate is the reaction product between Carbowax 750 and acrylic acid. The preparation of Carbowax 750 acrylate is described in Example 2 of U.S. Pat. No. 3,787,351 (Olson).

Preparation of Fluorochemical Oligomer: A fluorochemical oligomer was prepared as described in Example 1, part A of U.S. Pat. No. 5,468,812.

Into an approximately 950 mL bottle was placed 75.0 g (0.120 mol) of N-ethyl-perfluoro(octane)sulfonamidoethyl methacrylate, 117.5 g (0.146 mol) of Carbowax™ 750 acrylate, 25.0 g (0.216 mol) of hydroxyethyl acrylate, 250 g of ethyl acetate solvent, 5.0 g (0.034 mol) of n-octylthiol, and 0.625 g of azo-bis-iso-butyronitrile. The bottle and contents were deaerated under reduced pressure, purged with nitrogen, capped tightly, then heated and agitated in a Launder-O-Meter at 65° C. for 16 hours to afford a fluorochemical oligomer. The bottle was cooled, degassed under reduced pressure, purged with air, and used in the next step. The solution contained 48 wt % of oligomer in ethyl acetate. The oligomer contained 34.5% fluoroaliphatic monomer, 54.0% organic solubilizing monomer, and 11.5% bifunctional monomer.

Preparation of Durable Low Energy Surface Polymer: A durable, low energy surface polymer was prepared by mixing the following:

20.8 g of the 48 wt % solution of the above fluorochemical oligomer in ethyl acetate 76.67 g of γ-glycidoxypropyl trimethoxysilane 13.33 g of 30% triphenylsulfonium hexafluoroantinonate in γ-glycidoxypropyl trimethoxysilane.

In this formulation, the fluorochemical oligomer comprised 10 wt %, the triphenylsulfonium hexafluoroantimonate comprised 4 wt %, and the (γ-glycidoxypropyl trimethoxysilane (Z-6040) comprised 86 wt %.

Preparation of Primer Composition: A primer composition was prepared by mixing the following:

Glycerol propoxy triacrylate (Ebecryl 53, from Radcure, Inc.)=53.8 wt %

1,6-Hexanediol diacrylate (SR 238, from Sartomer Resins, Inc.)=33.1 wt %

Dipentaerylthritol hydroxypentaacrylate (SR 399, from Sartomer Resins, Inc.)=5.5 wt %

Irgacure 184 (1-Hydroxycyclohexylphenyl ketone from Ciba-Geigy)=7.6 wt %

Application of the Primer and the DLSE Polymer to a Coating Die: An extrusion die top 12 and a die body 16 similar to that shown in FIGS. 1–3 were each masked off to expose only the portion of these die components which were to be abraded (shown as DLSE surface 50). Prior to this step, a recess was machined into the die body 16 where the DLSE surface 50 was to be located; no recess was machined into the die top 14. Once masked, the die components were each placed into the previously described grit-blasting apparatus 60 and abraded using a Silicon Carbide powder having a 50-$\mu$m particle size. Gas (nitrogen) pressure was set at 100 lb/in$^2$ (6.89×10$^2$ kPa); the orifices of the nozzles 62 were positioned 1.25 cm from the die body 16; and, the nozzles were translated across the die component at a rate of 2.5 cm/min and pivoted or reciprocated at a rate of 24 cycles/min.

The abraded die component was then primed with the previously described primer composition. FIG. 4 schematically illustrates a preferred priming approach. This approach involved the steps of: (a) positioning the abraded portion 66 of the die body 16 (or die top 14) relative to a composition applicator 70 and such that the abraded portion 66 is level, (b) translating the composition applicator 70 at a controlled velocity relative to the die body 16, (c) controlling the volumetric rate of primer composition from the composition applicator 70 to the die body 16, and (d) allowing the primer composition to spread over the abraded portion 66 of the die body 16. The composition applicator 70 included a needle 72, syringe 74, and an actuating mechanism 76 for compressing the syringe at a controlled rate. When applying the primer composition to the abraded portion 66 which was approximately 12.5 mm wide and 0.08 mm deep, the primer composition was dispensed at a rate of 7.0 cm$^3$/hour and the composition applicator 70 was preferably translated at a rate of 15.2 cm/min. After dispensing the primer composition down the length of the abraded portion 66, the die body 16 was held stationary for the necessary time for the primer composition to flow outwardly and cover the abraded portion 66. A small paint brush, with all but a few brush fibers removed, was used to spread the primer composition to any area uncovered by the primer composition.

Following the application of the primer composition to the abraded portion 66, the primer composition was subjected to previously described XENON™ ultraviolet radiation source to cure the composition. The ultraviolet radiation tube was positioned approximately 1.6 cm above the primer composition and pulsed at a rate of 10 bursts per second for 60 seconds.

After the primer composition was cured on the die body 16, the primed surface was grit blasted using the same nozzles 64 as previously mentioned, but with a Silicon Carbide powder (20 $\mu$m particle size). Gas (nitrogen) pressure was 70 lb/in$^2$ (4.83×10$^2$ kPa); the distance from the orifice of the nozzles 64 to the workpiece was 25.4 mm; the nozzles 64 were pivoted at a rate of 24 cycles/sec; and, the nozzles were translated such that the nozzle streams moved across the die body 16 at a rate of 15.2 cm/min.

Next, the previously described DLSE composition was applied to the abraded, primed surface using the composition applicator 70 and following the same steps as those previously described for applying the primer composition, except that dispensed rate is preferably 5 cm$^3$/hr.

The DLSE composition was cured using the previously described curing equipment. The pulsed ultraviolet radiation was applied for a duration of 18 seconds. After curing the DLSE coating on the die top 14, the very tip of the downstream die lip 32 was polished to remove or reduce the roughness at the tip which can be caused by the grit blasting step. Care is required at this step to minimize the abrading of the DLSE surface 50.

These compositions and this process of preparing the extrusion die provided a low surface energy to the treated surface. Contact angle measurements of the DLSE surface 50 with water, a 6.4% MEK in water solution, and 100% MEK gave contact angles of 100.1 degrees, 69.2 degrees, and 43.6 degrees, respectively. In use, the DLSE surface 50 was observed to reduce streaking even after a web broke and directly struck the DLSE surface 50.

Example 2

Example 2 is similar to Example 1 except that the fluorochemical oligomer in ethyl acetate was at 1% solids, rather than 10%. This composition change provided similar performance results to those provided by the composition in Example 1.

Example 3

Example 3 is similar to Example 1 except that the fluorochemical oligomer in ethyl acetate was at 5% solids, rather than 10%. This composition change provided similar performance results to those provided by the composition in Example 1.

Example 4

Example 4 is similar to Example 1 except that the fluorochemical oligomer in ethyl acetate was at 20% solids, rather than 10%. This composition change provided similar performance results to those provided by the composition in Example 1.

Comparative Example: Polytetrafluoroethylene Coating

A polytetrafluoroethylene (PTFE) coating (primer and top-coat) was applied to a die part, including a die top and a die body. Approximately the same preparation as that described in the previous examples was used including the grit blasting the die part surface. A primer was prepared by agitating the primer and filtering it through a 150 mesh stainless steel wire screen or cheese cloth. The primer was applied to die part surface using the same approach as that described in previous examples. The desired dried coating thickness of the primer was 0.001 inch (25.4 $\mu$m). The primer was air dried for 1–5 minutes, then was placed into an oven and slowly heated to 400–450° F. (204–232° C.) for 10 minutes. The oven was then turned off so that the die part could cool to approximately room temperature. The primer used was 856-204 series, green Teflon™-S non-stick primer (available from DuPont). The die part surface was then cleaned and degreased.

The PTFE top coating was then prepared (856-200 series clear top coat, DuPont) by gently agitating or stirring for 15–30 minutes and filtered through a 100-mesh stainless steel screen. The die part was preheated to 120–140° F. (48.8–60.0° C.)and the top coating was left at room temperature. The top coating was then sprayed onto the primed surface at 40–50 lb/in$^2$ (2.76×10$^2$–3.45 kPa). The maximum thickness for the dried top coating was 0.001 inch (25.4 $\mu$m).

The top-coated die part was then placed back into the oven and slowly heated to 575° F. (301.7° C.) for 60 minutes. Then, the die part was allowed to slowly cool down to at least 150° F. (65.6° C.). Then, additional layers of the top coat and additional heat-up and cool-down steps were taken to create a final dry top coating thickness of 0.004–0.006 inch (101.6–152.4 $\mu$m) (i.e., at least three to five repetitions).

Contact angle testing of this coating was not done. But, the result of such testing is expected to be similar to the contact angles for virgin Teflon™. When using water, the contact angle for the virgin Teflon™ was 84.0 degrees; when using a 6.4% MEK in water solution, the contact angle for the virgin Teflon™ was 36.9 degrees; and using 100% MEK, the contact angle for the virgin Teflon™ was 23.2 degrees.

Reasonable modifications and variations are possible from the foregoing disclosure without departing from either the spirit or scope of the present invention as defined by the claims.

What is claimed is:

1. A slide coating apparatus for coating liquid, comprising:
   a first slide member having a first slide surface onto which a first liquid may flow; and
   a second slide member having a second slide surface over which the first liquid may flow;
   wherein the first slide member is positioned relative to the second slide member to form a first slot therebetween through which the first liquid may flow before flowing over the second slide surface, the first slide surface being positioned relative to the second slide surface such that at least a portion of the first liquid flowing from the first slot may flow onto the first slide surface rather than to flow directly from the first slot over the second slide surface, the first slide surface having a low surface energy region positioned such that the low surface energy region may come in contact with the first liquid flowing from the first slot.

2. The slide coating apparatus of claim 1, the first slide member being a first slide block and the second slide member being a second slide block.

3. The slide coating apparatus of claim 2, the first and second slide blocks comprising stainless steel.

4. The slide coating apparatus of claim 1, the second slide surface having a greater surface energy than the low surface energy region.

5. The slide coating apparatus of claim 1, the first slide surface having a second region apart from the low surface energy region, the second region having a greater surface energy than the low surface energy region.

6. The slide coating apparatus of claim 1, the second slide surface being angled downwardly away from the first slot.

7. The slide coating apparatus of claim 1, the first slide surface being angled downwardly toward the first slot.

8. The slide coating apparatus of claim 1, the first slide member having a first front surface that partially forms the first slot and forms a first front edge with the first slide surface, the low surface energy region positioned adjacent the first front edge.

9. The slide coating apparatus of claim 8, the low surface energy region positioned substantially parallel to the first front edge.

10. The slide coating apparatus of claim 1, the first slide surface having a center region, a right side region, and a left side region, the low surface energy region being positioned on at least one of the right and left side regions.

11. The slide coating apparatus of claim 10, the first slide member comprising a right side edge guide and a left side edge guide, the right side edge guide providing the right slide region and the left side edge guide providing the left side region.

12. The slide coating apparatus of claim 1, the first slide surface being planar to the second slide surface.

13. The slide coating apparatus of claim 1, further comprising a back-up roll positioned such that the second slide member is between the back-up roll and the first slide member, the back-up roll providing support for a substrate such that the first liquid may flow onto the substrate.

14. The slide coating apparatus of claim 1, further comprising a third slide member positioned such that the second slide member is between the first slide member and the third slide member.

15. The slide coating apparatus of claim 1, further comprising at least one additional slide member positioned relative to the first and second slide members to form at least a second slot through which a second liquid may flow and over which the first liquid may flow.

16. The slide coating apparatus of claim 1, the low surface energy region comprising a fluorochemical compound.

17. A slide coating apparatus for coating liquid, comprising:
   a first slide block having a first slide surface onto which a first liquid may flow;
   a second slide block having a second slide surface over which the first liquid may flow;
   a back-up roll positioned such that the second slide block is between the back-up roll and the first slide block, the back-up roll providing support for a coating substrate onto which the first liquid may flow;
   the first slide block being positioned relative to the second slide block to form a first slot therebetween through which the first liquid may flow before flowing over the second slide surface, the first slide surface being angled downwardly toward the first slot and the second slide surface being angled downwardly away from the first slot, the first slide surface being positioned relative to the second slide surface such that at least a portion of the first liquid may flow onto the first slide surface rather than to flow directly from the first slot and down the second slide surface, the first slide surface having a low surface energy region positioned such that the low surface energy region may come in contact with the first liquid flowing from the first slot, the second slide surface having a greater surface energy than the low surface energy region.

18. The slide coating apparatus of claim 17, further comprising at least one additional slide block positioned relative to the first and second slide blocks to form at least a second slot through which a second liquid may flow and over which the first liquid may flow.

19. A slide coating apparatus for coating liquid, comprising:
   a first slide block having a first slide;
   a second slide block having a second slide surface and being positioned relative to the first slide block to form a first slot therebetween through which a first liquid may flow, wherein the first and second slide blocks are constructed and oriented such that gravity causes the first liquid to flow over the second slide surface after flowing from the first slot;
   a third slide block having a third slide surface and being positioned relative to the second slide block to form a second slot therebetween through which a second liquid may flow, wherein the second and third slide blocks are constructed and oriented such that gravity causes the second liquid to flow over the third slide surface after flowing from the first slot and causes the first liquid to flow onto the second liquid and over the third slide surface after flowing over the second slide surface;
   a back-up roll positioned such that the third slide block is between the back-up roll and the second slide block, the back-up roll providing support for a coating substrate onto which the first and second liquids may flow;
   wherein the first slide comprises a first region on the first slide surface having a low surface energy and positioned to contact the first liquid flowing from the first slot to reduce the flow of the first fluid onto the first slide surface.

20. The slide coating apparatus of claim 19, wherein the first slide surface further comprises a second region on the first slide surface having a surface energy that is higher than the first region of the first slide surface.

21. A method for slide coating liquids onto a substrate, comprising:

providing a first slide block having a first slide;

providing a second slide block having a second slide surface and being positioned relative to the first slide block to form a first slot therebetween through which a first liquid may flow, wherein the first and second slide blocks are constructed and oriented such that gravity causes the first liquid to flow over the second slide surface after flowing from the first slot;

providing a third slide block having a third slide surface and being positioned relative to the second slide block to form a second slot therebetween through which a second liquid may flow, wherein the second and third slide blocks are constructed and oriented such that gravity causes the second liquid to flow over the third slide surface after flowing from the first slot and causes the first liquid to flow onto the second liquid and over the third slide surface after flowing over the second slide surface;

providing a back-up roll positioned such that the third slide block is between the back-up roll and the second slide block, the back-up roll providing support for a coating substrate onto which the first and second liquids may flow;

reducing the flow of the first fluid onto the first slide surface by providing a first region on the first slide surface having a low surface energy and positioned the first region on the first slide surface to contact the first liquid flowing from the first slot.

22. The method of claim 21, further providing a second region on the first slide surface having a surface energy that is higher than the first region of the first slide surface.

* * * * *